(12) United States Patent
Yang et al.

(10) Patent No.: US 11,991,669 B2
(45) Date of Patent: May 21, 2024

(54) FEEDBACK CONTROL CHANNEL CONFIGURATION METHOD AND DEVICE

(71) Applicant: HUAWEI TECHNOLOGIES CO., LTD., Guangdong (CN)

(72) Inventors: Fan Yang, Beijing (CN); Junwei Wang, Shenzhen (CN); Xingwei Zhang, Lund (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 406 days.

(21) Appl. No.: 17/351,518

(22) Filed: Jun. 18, 2021

(65) Prior Publication Data

US 2021/0314921 A1 Oct. 7, 2021

Related U.S. Application Data

(63) Continuation of application No. PCT/CN2019/125387, filed on Dec. 13, 2019.

(30) Foreign Application Priority Data

Dec. 19, 2018 (CN) .......................... 201811554313.6

(51) Int. Cl.
*H04W 72/02* (2009.01)
*H04L 1/00* (2006.01)
(Continued)

(52) U.S. Cl.
CPC ........... *H04W 72/02* (2013.01); *H04L 1/0004* (2013.01); *H04L 27/26025* (2021.01);
(Continued)

(58) Field of Classification Search
CPC ............. H04W 72/02; H04W 72/0446; H04W 72/0453; H04W 72/20; H04L 1/0004;
(Continued)

(56) References Cited

U.S. PATENT DOCUMENTS

2012/0257568 A1 10/2012 Cai et al.
2016/0073408 A1* 3/2016 Sartori .............. H04W 72/0453
370/329
(Continued)

FOREIGN PATENT DOCUMENTS

CN 101753278 A 6/2010
CN 101867536 A 10/2010
(Continued)

OTHER PUBLICATIONS

R1-1813139, Sony, Discussion on NR V2X resource allocation mechanism, 3GPP TSG RAN WG1 Meeting #95, Spoken, USA, Nov. 12-16, 2018, total 4 pages.
(Continued)

*Primary Examiner* — Abdullahi Ahmed
(74) *Attorney, Agent, or Firm* — WOMBLE BOND DICKINSON (US) LLP

(57) ABSTRACT

Embodiments of this application provide a feedback control channel configuration method and a device, and relate to the field of wireless communication. A candidate time-frequency resource may be configured for a physical sidelink feedback control channel (PSFCH) that carries feedback control information, so that the required feedback control information can be fed back on the PSFCH. The method includes: determining, by first user equipment, configuration information of a PSFCH, where the configuration information of the PSFCH is to indicate or configure a candidate time-frequency resource of the PSFCH, and the candidate time-frequency resource of the PSFCH is to the carry feedback control information of first information; and sending, by the first user equipment, the configuration information of the PSFCH to second user equipment.

20 Claims, 7 Drawing Sheets

(51) Int. Cl.
  *H04L 27/26* (2006.01)
  *H04W 72/0446* (2023.01)
  *H04W 72/0453* (2023.01)
  *H04W 72/20* (2023.01)
(52) U.S. Cl.
  CPC ... *H04W 72/0446* (2013.01); *H04W 72/0453* (2013.01); *H04W 72/20* (2023.01)
(58) Field of Classification Search
  CPC ............ H04L 27/26025; H04L 1/1854; H04L 1/1861; H04L 1/1864; H04L 5/0051; H04L 5/0053
  See application file for complete search history.

(56) References Cited

U.S. PATENT DOCUMENTS

| | | | |
|---|---|---|---|
| 2018/0092122 A1* | 3/2018 | Babaei | H04L 1/1822 |
| 2020/0196293 A1* | 6/2020 | Liu | H04L 1/1861 |
| 2020/0351033 A1* | 11/2020 | Ryu | H04W 72/0453 |
| 2021/0314796 A1* | 10/2021 | Hoang | H04W 52/36 |
| 2023/0146547 A1* | 5/2023 | Zeng | H04W 72/25 |
| 2023/0217449 A1* | 7/2023 | Yan | H04W 72/04 370/329 |

FOREIGN PATENT DOCUMENTS

| | | |
|---|---|---|
| CN | 104954976 A | 9/2015 |
| CN | 104145518 B | 2/2018 |
| CN | 107852302 A | 3/2018 |
| CN | 108183778 A | 6/2018 |
| CN | 108322414 A | 7/2018 |
| CN | 108353063 A | 7/2018 |
| CN | 108847918 A | 11/2018 |
| EP | 3242515 A1 | 11/2017 |
| WO | 2018085044 A1 | 5/2018 |
| WO | 2018201448 A1 | 11/2018 |

OTHER PUBLICATIONS

R1-1813976, ITL, Discussion on NR V2X HARQ mechanism, 3GPP TSG RAN WG1 Meeting #95, Spokane, USA, Nov. 12-16, 2018, total 4 pages.

R1-1813938, LG Electronics, Feature lead summary for agenda item 7.2.4.1.2 Physical layer procedures, 3GPP TSG RAN WG1 Meeting #95, Spokane, USA, Nov. 12-16, 2018, total 12 pages.

R1-1812985, Samsung, Discussion on Physical Layer Procedures, 3GPP TSG RAN WG1 Meeting #95, Spokane, USA, Nov. 12-16, 2018, total 6 pages.

R1-1903337, vivo, Discussion on resource allocation mechanism for NR V2X, 3GPP TSG RAN WG1 #96, Athens, Greece, Feb. 25-Mar. 1, 2019, total 13 pages.

R1-1810984, Oppo, Discussion of sidelink unicast, groupcast and broadcast for NR-V2X, 3GPP TSG RAN WG1 Meeting #94bis, Chengdu, China, Oct. 8-12, 2018, total 4 pages.

R1-1814265, LG Electronics, Updated feature lead summary for agenda item 7.2.4.1.2 Physical layer procedures, 3GPP TSG RAN WG1 Meeting #95, Spokane, USA, Nov. 12-16, 2018, total 12 pages.

* cited by examiner

FEEDBACK CONTROL CHANNEL CONFIGURATION METHOD AND DEVICE

CROSS-REFERENCE TO RELATED APPLICATIONS

This application is a continuation of International Application No. PCT/CN2019/125387, filed on Dec. 13, 2019, which claims priority to Chinese Patent Application No. 201811554313.6, filed Dec. 19, 2018. The disclosures of the aforementioned applications are hereby incorporated by reference in their entireties.

TECHNICAL FIELD

This application relates to the field of wireless communication, and in particular, to a feedback control channel configuration method and a device.

BACKGROUND

In a 5G new radio system, a base station sends downlink data to UE on a downlink, and the UE correspondingly feeds back hybrid automatic repeat request-acknowledgment (HARQ-ACK) information on an uplink. Alternatively, a base station may send a downlink reference signal on a downlink, and UE further measures the downlink reference signal and feeds back corresponding channel state information (CSI), for example, periodic/semi-persistent CSI. HARQ information and the periodic/semi-persistent CSI information are carried on an uplink control channel and belong to uplink control information. In a broad sense, the HARQ-ACK information and the periodic/semi-persistent CSI information are feedbacks of downlink data and information, and are a type of feedback control information.

Correspondingly, on a sidelink, data or information (for example, a reference signal) may be sent by one UE (namely, sending UE) to another UE or another group of UEs (namely, receiving UE), and the receiving UE needs to feed back corresponding information to the sending UE. However, in the 5G new radio system, there is currently no method for feeding back control information on a sidelink.

SUMMARY

Embodiments of this application provide a feedback control channel configuration method and a device, to configure a candidate time-frequency resource for a physical sidelink feedback control channel (PSFCH) that carries feedback control information, so that the required feedback control information can be fed back on the PSFCH.

To achieve the foregoing objective, the following technical solutions are used in the embodiments of this application.

According to a first aspect, this application provides a feedback control channel configuration method. The method includes: First user equipment determines configuration information of a physical sidelink feedback control channel PSFCH, where the configuration information of the PSFCH is used to indicate or configure a candidate time-frequency resource of the PSFCH, and the candidate time-frequency resource of the PSFCH is used to carry feedback control information of first information; and the first user equipment sends the configuration information of the PSFCH to second user equipment. The first information may include information of data sent by the first user equipment to the second user equipment, and the corresponding feedback control information may include hybrid automatic repeat request-acknowledgment (HARQ-ACK) information or hybrid automatic repeat request-negative acknowledgment (HARQ-NACK) information that is for the data and that is sent by the second user equipment to the first user equipment. The first information may further include reference information sent by the first user equipment to the second user equipment, where the reference information is used to indicate the second user equipment to measure a channel state, and the corresponding feedback control information may include measurement information of the channel state corresponding to the reference information. Based on this solution, the first user equipment may indicate or configure the candidate time-frequency resource for the PSFCH that carries the feedback control information, so that the required feedback control information is fed back on the PSFCH.

In one embodiment, the configuration information of the PSFCH includes one or more of the following information: format information of the PSFCH, orthogonal frequency division multiplexing OFDM symbol quantity information of the PSFCH, identifier information of a resource pool of the PSFCH, a quantity of bits of the feedback control information, a quantity of codebooks of the feedback control information, a codebook count of the feedback control information, candidate time-frequency resource information of the PSFCH, and repetition quantity information of the configuration information of the PSFCH. Based on this solution, the first user equipment may indicate or configure the candidate time-frequency resource of the PSFCH by using one or more of the format information of the PSFCH, the OFDM symbol quantity information of the PSFCH, the identifier information of the resource pool of the PSFCH, the quantity of bits of the feedback control information, the quantity of codebooks of the feedback control information, the codebook count of the feedback control information, candidate time-frequency resource information of the PSFCH, and repetition quantity information of the configuration information of the PSFCH. In this way, the required feedback control information is fed back on the PSFCH.

In one embodiment, there is a correspondence between the format information of the PSFCH and a modulation and coding scheme MCS or a subcarrier spacing SCS of the first information, or a quantity of OFDM symbols of the PSFCH. Based on this solution, the second user equipment may configure a format of the PSFCH by using the MCS or the SCS of the first information, or the OFDM symbol quantity information of the PSFCH, so that the required feedback control information is fed back on the PSFCH.

In one embodiment, there is a correspondence between the OFDM symbol quantity information of the PSFCH and the MCS or the SCS of the first information, or the format information of the PSFCH. Based on this solution, the second user equipment may configure the quantity of OFDM symbols of the PSFCH by using the MCS or the SCS of the first information, or the format of the PSFCH, so that the required feedback control information is fed back on the PSFCH.

In one embodiment, a quantity of second user equipments is N, N is a positive integer greater than or equal to 1, the configuration information of the PSFCH further includes a candidate time-frequency resource offset, and the candidate time-frequency resource offset is used to configure candidate time-frequency resources of PSFCHs of the N second user equipments. Based on this solution, the first user equipment may configure different candidate time-frequency resources for the N second user equipments by using the candidate time-frequency resource offset, so that the required feedback control information is fed back on the PSFCH.

In one embodiment, the first user equipment sends the configuration information of the PSFCH through a physical sidelink control channel PSCCH or a physical sidelink shared channel PSSCH. Based on this solution, the first user equipment may send the configuration information of the PSFCH through the PSCCH or the PSSCH, so that the required feedback control information is fed back on the PSFCH.

In one embodiment, the first user equipment receives, on the candidate time-frequency resource indicated or configured by using the configuration information of the PSFCH, the feedback control information sent by the second user equipment. Based on this solution, the first user equipment may receive, on the candidate time-frequency resource indicated or configured by using the configuration information of the PSFCH, the feedback control information sent by the second user equipment, so that the required feedback control information is fed back on the PSFCH.

According to a second aspect, this application provides a feedback control channel configuration method. The method includes: Second user equipment receives configuration information of a PSFCH from first user equipment, where the configuration information of the PSFCH is used to indicate or configure a candidate time-frequency resource of the PSFCH, and the candidate time-frequency resource of the PSFCH is used to carry feedback control information of first information; the second user equipment determines a resource pool of the PSFCH based on the configuration information of the PSFCH; and the second user equipment determines the candidate time-frequency resource in the resource pool based on the configuration information of the PSFCH. Based on this solution, the second user equipment may determine the candidate time-frequency resource of the PSFCH based on the configuration information of the PSFCH, so that the required feedback control information is fed back on the PSFCH.

In one embodiment, the configuration information of the PSFCH includes one or more of the following information: format information of the PSFCH, OFDM symbol quantity information of the PSFCH, identifier information of the resource pool of the PSFCH, a quantity of bits of the feedback control information, a quantity of codebooks of the feedback control information, a codebook count of the feedback control information, candidate time-frequency resource information of the PSFCH, and repetition quantity information of the configuration information of the PSFCH. Based on this solution, the second user equipment may determine the candidate time-frequency resource of the PSFCH by using one or more of the format information of the PSFCH, the OFDM symbol quantity information of the PSFCH, the identifier information of the resource pool of the PSFCH, the quantity of bits of the feedback control information, the quantity of codebooks of the feedback control information, the codebook count of the feedback control information, candidate time-frequency resource information of the PSFCH, and repetition quantity information of the configuration information of the PSFCH that are indicated or configured by the first user equipment, so that the required feedback control information is fed back on the PSFCH.

In one embodiment, the second user equipment determines a format of the PSFCH based on an MCS or an SCS of the first information, or a quantity of OFDM symbols of the PSFCH. Based on this solution, the second user equipment may determine the format of the PSFCH by using the MCS or the SCS of the first information, or the quantity of OFDM symbols of the PSFCH, so that the required feedback control information is fed back on the PSFCH.

In one embodiment, the second user equipment determines the quantity of OFDM symbols of the PSFCH based on the MCS or the SCS of the first information, or the format of the PSFCH. Based on this solution, the second user equipment may determine the quantity of OFDM symbols of the PSFCH by using the MCS or the SCS of the first information, or the format of the PSFCH, so that the required feedback control information is fed back on the PSFCH.

In one embodiment, a quantity of second user equipments is N, N is a positive integer greater than or equal to 1, the configuration information of the PSFCH further includes a candidate time-frequency resource offset, and the candidate time-frequency resource offset is used to configure the candidate time-frequency resource of the PSFCH. Based on this solution, the second user equipment may determine different candidate time-frequency resources for the N second user equipments by using the candidate time-frequency resource offset, so that the required feedback control information is fed back on the PSFCH.

In one embodiment, the second user equipment sends the feedback control information to the first user equipment on the candidate time-frequency resource indicated or configured by using the configuration information of the PSFCH. Based on this solution, the second user equipment may send the feedback control information to the first user equipment on the candidate time-frequency resource indicated or configured by using the configuration information of the PSFCH, so that the required feedback control information is fed back on the PSFCH.

In one embodiment, the second user equipment performs detection on a channel on which the candidate time-frequency resource indicated or configured by using the configuration information of the PSFCH is located; and if a channel on which a first candidate time-frequency resource is located is idle, the second user equipment sends the feedback control information to the first user equipment on the first candidate time-frequency resource. Based on this solution, the second user equipment may send the feedback control information to the first user equipment when detecting that the channel on which the first candidate time-frequency resource is located is idle, so that the required feedback control information is fed back on the PSFCH.

According to a third aspect, this application provides user equipment. The user equipment has a function of implementing the method according to the first aspect. The function may be implemented by hardware, or may be implemented by hardware by executing corresponding software. The hardware or the software includes one or more modules corresponding to the function.

According to a fourth aspect, this application provides user equipment. The user equipment has a function of implementing the method according to the second aspect. The function may be implemented by hardware, or may be implemented by hardware by executing corresponding software. The hardware or the software includes one or more modules corresponding to the function.

According to a fifth aspect, this application further provides user equipment, including: at least one processor, at least one memory, and a communication interface, where the communication interface and the at least one memory are coupled to the at least one processor; the user equipment communicates with another device through the communication interface, and the at least one memory is configured to store a computer program, so that when the computer program is executed by the at least one processor, the feedback control channel configuration method according to the first aspect and the possible embodiments of the first aspect or the second aspect and the possible embodiments of the second aspect is implemented.

According to a sixth aspect, this application provides a computer-readable storage medium, for example, a non-transitory computer-readable storage medium. The computer-readable storage medium stores a computer program. When the computer program runs on a computer, the computer is enabled to perform the method according to any possible embodiment of the first aspect or the method according to any one possible embodiment of the second aspect. For example, the computer may be at least one storage node.

According to a seventh aspect, this application further provides a computer program product. When the computer program product runs on a computer, the method according to the first aspect or the method according to the second aspect is performed. For example, the computer may be at least one storage node.

According to an eighth aspect, this application provides a communication system. The communication system may include any one or more of the following: the user equipment according to the third aspect, the user equipment according to the fourth aspect, the user equipment according to the fifth aspect, the computer-readable storage medium according to the sixth aspect, or the computer program product according to the seventh aspect.

It may be understood that any user equipment, computer-readable storage medium, or computer program product provided above is configured to perform a corresponding method provided above. Therefore, for a beneficial effect that can be achieved by the user equipment, computer-readable storage medium, or computer program product, refer to a beneficial effect in the corresponding method. Details are not described herein again.

DESCRIPTION OF EMBODIMENTS

The following describes technical solutions in embodiments of this application with reference to accompanying drawings in the embodiments of this application. In the description of this application, "l" represents an "or" relationship between associated objects unless otherwise specified. For example, AB may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, in the description of this application, "a plurality of" means two or more unless otherwise specified. "At least one item (piece) of the following" or a similar expression thereof means any combination of these items, including a singular item (piece) or any combination of plural items (pieces). For example, at least one of a, b, or c may indicate: a, b, c, a and b, a and c, b and c, or a, b, and c, where a, b, and c may be singular or plural. In addition, for convenience of clear description of the technical solutions in the embodiments of this application, in the embodiments of this application, terms such as "first" and "second" are used to distinguish between same objects or similar objects whose functions and purposes are basically the same. A person skilled in the art may understand that the terms such as "first" and "second" do not limit a quantity or an execution sequence, and the terms such as "first" and "second" do not indicate a definite difference.

In addition, a network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that with evolution of the network architecture and emergence of a new service scenario, the technical solutions provided in the embodiments of this application are also applicable to similar technical problems.

Figure 1:
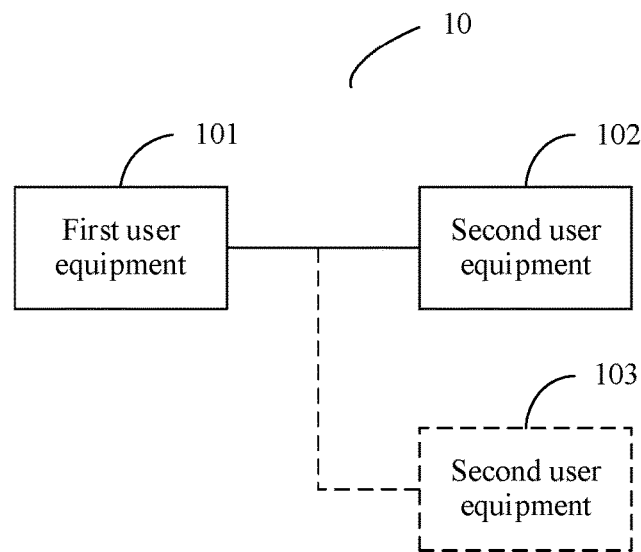
FIG. 1 is a diagram of an architecture of a communication system according to an embodiment of this application.

FIG. 1 is a diagram of an architecture of a communication system 10 according to an embodiment of this application. In FIG. 1, the communication system 10 includes first user equipment 101 and second user equipment 102.

In one embodiment, the first user equipment 101 or the second user equipment 102 provided in the embodiments of this application may be a portable computer (for example, a mobile phone), a notebook computer, a personal computer (PC), a wearable electronic device (for example, a smartwatch), a tablet computer, an augmented reality (AR) device/a virtual reality (VR) device, a vehicle, an in-vehicle assembly, an in-vehicle computer, an in-vehicle chip, an in-vehicle communication system, a wireless terminal in industrial control, or the like. Specific forms of the first user equipment 101 and the second user equipment 102 are not particularly limited in the following embodiment.

In a specific embodiment, in an embodiment, the communication system 10 may include a plurality of second user equipments, for example, the second user equipment 102 and second user equipment 103 in FIG. 1.

In one embodiment, the first user equipment 101 or the second user equipment 102 in FIG. 1 in this embodiment of this application may be implemented by one device, or may be jointly implemented by a plurality of devices, or may be a function module in one device. This is not specifically limited in this embodiment of this application. It may be understood that the foregoing functions may be network elements in a hardware device, or may be software functions running on dedicated hardware, or may be virtualization functions instantiated on a platform (for example, a cloud platform).

Figure 2:
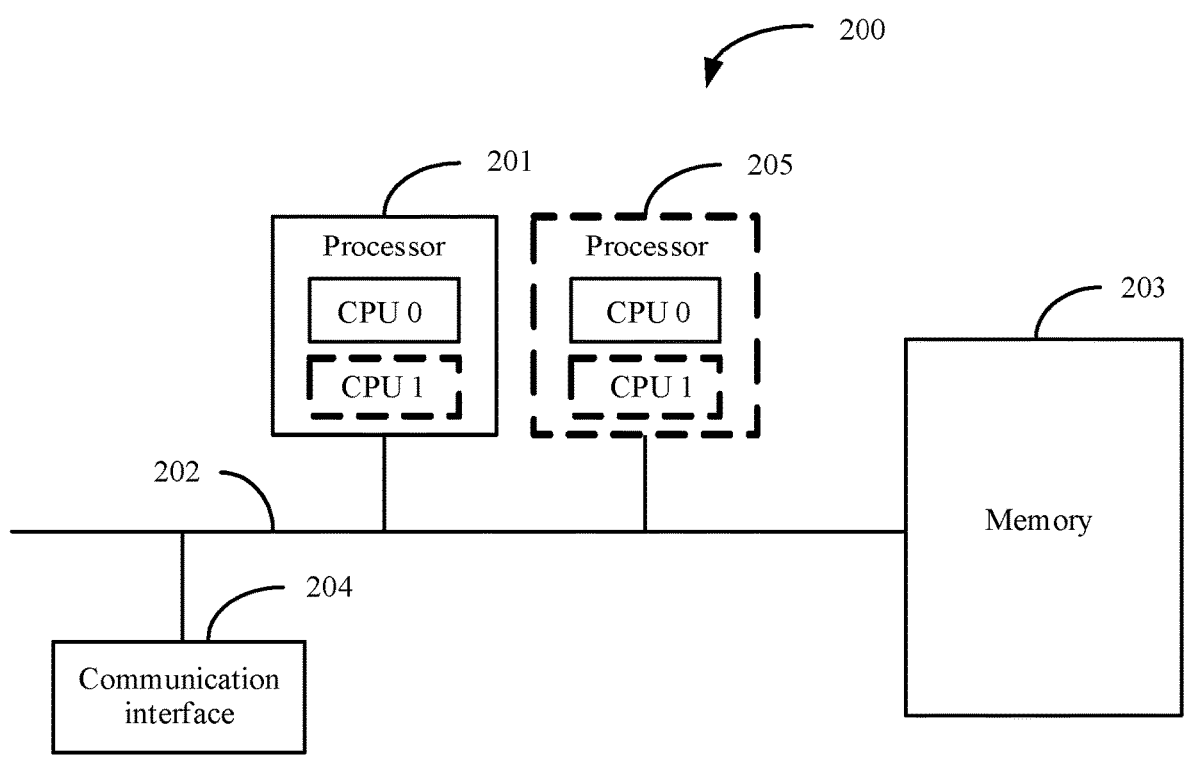
FIG. 2 is a diagram of a hardware structure of a communication device according to an embodiment of this application.

For example, the first user equipment 101 or the second user equipment 102 in FIG. 1 in this embodiment of this application may be implemented by a communication device in FIG. 2. FIG. 2 is a diagram of a hardware structure of the communication device according to an embodiment of this application. The communication device 200 includes a processor 201, a communication line 202, a memory 203, and at least one communication interface 204 (where description is provided in FIG. 2 merely by using an example in which the communication device 200 includes the communication interface 204).

The processor 201 may be a general-purpose central processing unit (CPU), a microprocessor, an application-specific integrated circuit (ASIC), or one or more integrated circuits that are configured to control execution of a program in the solutions of this application.

The communication line 202 may include a path for transmitting information between the foregoing components.

The communication interface 204 uses any apparatus such as a transceiver, to communicate with another device or a communication network, for example, the ethernet, a radio access network (RAN), or a wireless local area network (WLAN).

The memory 203 may be a read-only memory (ROM) or another type of static storage device that can store static information and instructions, or a random access memory (RAM) or another type of dynamic storage device that can store information and instructions. The memory 203 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray optical disc, and the like), a magnetic disk storage medium, or another magnetic storage device. The memory 203 may alternatively be any other medium that can be used to carry or store expected program code in a form of an instruction or a data structure and that can be accessed by a computer. This is not limited. The memory may exist independently, and is connected to the processor through the communication line 202. The memory may alternatively be integrated with the processor.

The memory 203 is configured to store computer execution instructions for executing the solutions of this application, and the processor 201 controls the execution. The processor 201 is configured to execute the computer execution instructions stored in the memory 203, to implement a feedback control channel configuration method provided in the following embodiments of this application.

In one embodiment, the computer execution instructions in the embodiments of this application may also be referred to as application program code. This is not specifically limited in the embodiments of this application.

During specific embodiment, in an embodiment, the processor 201 may include one or more CPUs, for example, a CPU 0 and a CPU 1 in FIG. 2.

During specific embodiment, in an embodiment, the communication device 200 may include a plurality of processors, for example, the processor 201 and a processor 205 in FIG. 2. Each of these processors may be a single-core (single-CPU) processor, or may be a multi-core (multi-CPU) processor. The processor herein may be one or more devices, circuits, and/or processing cores configured to process data (for example, computer program instructions).

The foregoing communication device 200 may be a general-purpose device or a dedicated device. During specific embodiment, the communication device 200 may be a desktop computer, a portable computer, a network server, a palmtop computer (PDA), a mobile phone, a tablet computer, a wireless terminal device, an embedded device, or a device having a structure similar to that in FIG. 2. A type of the communication device 200 is not limited in this embodiment of this application.

The following specifically describes, with reference to FIG. 1 and FIG. 2, the feedback control channel configuration method provided in the embodiments of this application.

It should be noted that in the following embodiments of this application, names of messages between network elements, names of parameters in messages, or the like are merely examples, and may be other names in specific implementations. This is not specifically limited in the embodiments of this application.

First, an example in which the first user equipment 101 sends first information to the second user equipment 102, and the second user equipment 102 sends feedback control information of the first information to the first user equipment 101 is used for description. It should be noted that the second user equipment 102 may alternatively send second information to the first user equipment 101, and the first user equipment 101 may alternatively send feedback control information of the second information to the second user equipment. The first information and the second information may include data information of a sidelink, and may further include reference information, for example, a Zadoff-Chu sequence and a computer generated sequence. A person skilled in the art should understand that the first user equipment 101 and the second user equipment 102 in the embodiments of this application may be user equipments that send the data information, or may be user equipments that send the feedback control information of the data information.

Figure 3:
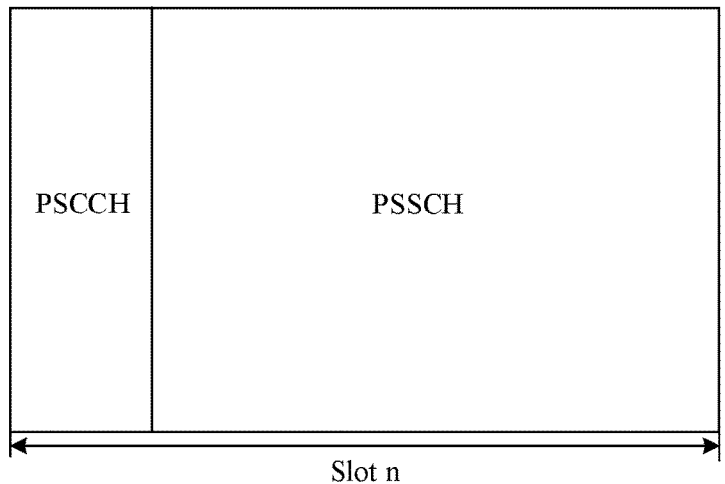
FIG. 3 is a diagram of a relationship between a PSCCH and a PSSCH according to an embodiment of this application.

It should be noted that, if the first user equipment 101 sends the first information to the second user equipment 102, the second user equipment 102 may have a plurality of methods for sending the feedback control information. For example, the second user equipment 102 may send the feedback control information of the first information through a physical sidelink control channel (PSCCH) or a physical sidelink shared channel (PSSCH) of the second user equipment 102. For example, a relationship between the PSSCH and the PSCCH may be shown in FIG. 3. For a slot n, the PSCCH includes related information indicating the PSSCH, and the PSSCH is used to carry data. For another example, the second user equipment 102 may send the feedback control information of the first information through a physical sidelink feedback control channel PSFCH of the second user equipment 102.

In a unicast scenario, for a case the first user equipment 101 and the second user equipment 102 periodically send information, when sending the second information to the first user equipment 101, the second user equipment 102 may send the feedback control information of the first information through the PSCCH or the PSSCH of the second user equipment 102. In this method for feeding back control information on the sidelink, if the feedback control information of the first information is relatively large, excessive resources of the control information or the data information are occupied. Consequently, a coding rate is increased, and demodulation performance is reduced. In addition, multiplexing the feedback control information of the first information on the PSCCH or the PSSCH further causes an extra delay. In a multicast scenario, the first user equipment 101 may send data or information to N (where N is a positive integer greater than 1) second user equipments. The N second user equipments may feed back hybrid automatic repeat request-acknowledgement (HARQ-ACK) information or hybrid automatic repeat request-acknowledgement (HARQ-NACK) information and/or channel state information CSI, but the N second user equipments do not necessarily periodically send the data to the first user equipment 101.

The second user equipment 102 may further send the feedback control information of the first information through the PSFCH of the second user equipment 102. The PSFCH is a feedback control channel that independently carries the feedback control information. Other non-feedback control information and data generally cannot use a frequency domain resource or a time domain resource on which the PSFCH is located. The following embodiments provided in this application describe a specific process of sending the feedback control information of the first information on the PSFCH of the second user equipment 102.

Figure 4:
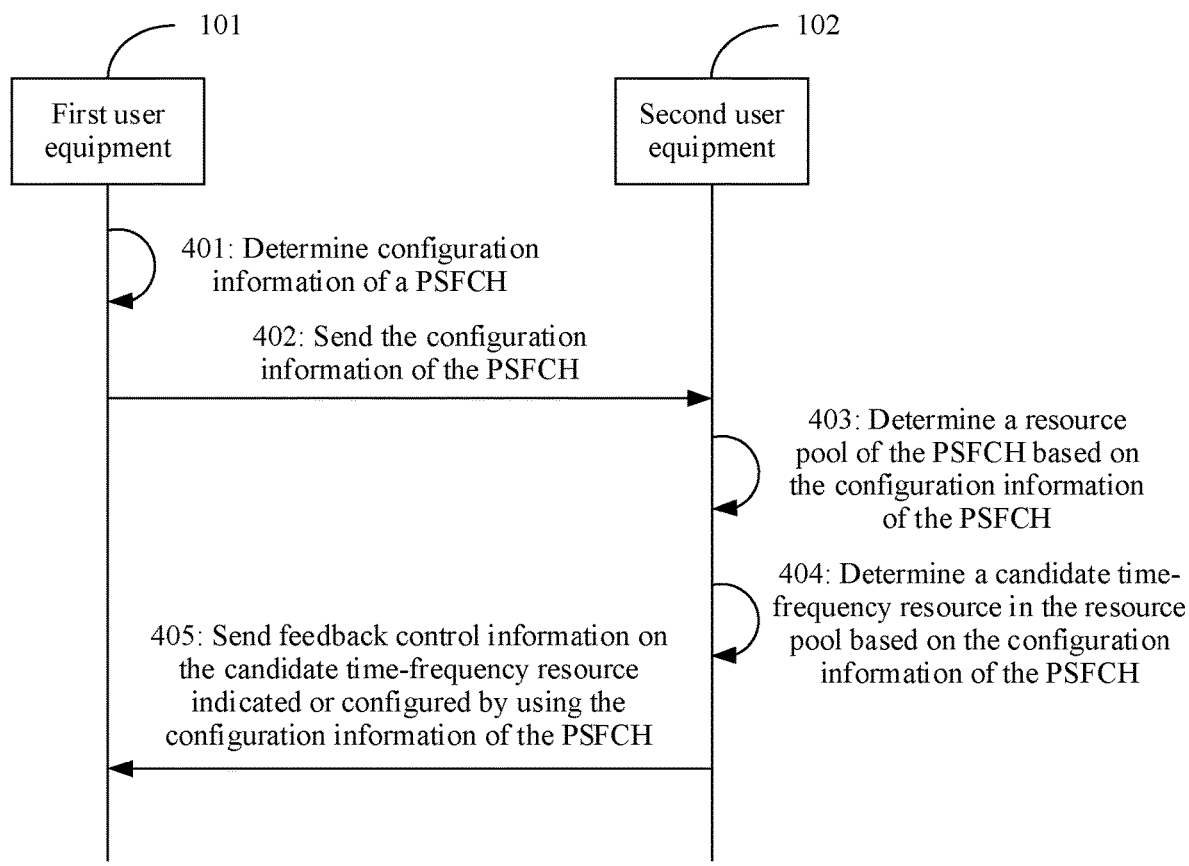
FIG. 4 is a flowchart of a feedback control channel configuration method according to an embodiment of this application.

FIG. 4 shows a feedback control channel configuration method according to an embodiment of this application. The feedback control channel configuration method includes the following operations.

Operation 401: The first user equipment 101 determines configuration information of the PSFCH.

It should be noted that the configuration information of the PSFCH is used to indicate or configure a candidate time-frequency resource of the PSFCH, and the candidate time-frequency resource of the PSFCH is used to carry the feedback control information of the first information. For example, the configuration information of the PSFCH includes one or more of the following information: format information of the PSFCH, orthogonal frequency division multiplexing OFDM symbol quantity information of the PSFCH, identifier information of a resource pool of the PSFCH, a quantity of bits of the feedback control information, a quantity of codebooks of the feedback control information, a codebook count of the feedback control information, candidate time-frequency resource information of the PSFCH, and repetition quantity information of the configuration information of the PSFCH.

The format information of the PSFCH includes a first format and/or a second format. The first format may be a format with a fixed quantity of symbols. For example, the first format may fixedly occupy one slot (14 symbols). A position of a demodulation reference signal DMRS symbol in the first format is fixed. For example, the DMRS symbol in the first format may be a symbol 2, a symbol 5, a symbol 8, and a symbol 10. The second format may be a format with a variable quantity of symbols. A change range may be $N_1$ to $N_2$. $N_1$ and $N_2$ are positive integers, and $0<N_1<N_2\leq 14$. A position of a DMRS symbol in the second format may be predefined. For example, if a change range of a quantity of symbols in the second format is 4 to 6, if a time domain length of the PSFCH is 4 symbols, a symbol 2 may be predefined as the DMRS symbol; if a time domain length of the PSFCH is 5 symbols, a symbol 3 may be predefined as the DMRS symbol; or if a time domain length of the PSFCH is 6 symbols, each of a symbol 1 and a symbol 4 may be predefined as the DMRS symbol. For example, a format of the PSFCH may be indicated by using one bit. If the format information of the PSFCH is indicated as 0 in the configuration information of the PSFCH, it may indicate that the format of the PSFCH is the first format. If the format information of the PSFCH is indicated as 1 in the configuration information of the PSFCH, it may indicate that the format of the PSFCH is the second format. A person skilled in the art should understand that the format information of the PSFCH may alternatively be indicated in another manner. This is not specifically limited in the embodiments of this application.

The OFDM symbol quantity information of the PSFCH is used to indicate a quantity of OFDM symbols of the PSFCH. For example, one or more sets, for example, {1, 2} and {4, 7, 14}, of the quantity of OFDM symbols of the PSFCH are preconfigured for the first user equipment 101 and the second user equipment 102. If the first user equipment 101 and the second user equipment 102 use the set {1, 2} as the set of the quantity of OFDM symbols of the target PSFCH, if the OFDM symbol quantity information of the PSFCH is indicated as 0 in the configuration information of the PSFCH, it may indicate that the quantity of OFDM symbols of the PSFCH is 1; or if the OFDM symbol quantity information of the PSFCH is indicated as 1 in the configuration information of the PSFCH, it may indicate that the quantity of OFDM symbols of the PSFCH is 2. The set of the quantity of OFDM symbols of the target PSFCH may be configured by using higher layer signaling. A person skilled in the art should understand that the OFDM symbol quantity information of the PSFCH may alternatively be indicated in another manner. This is not specifically limited in the embodiments of this application.

Figure 5:
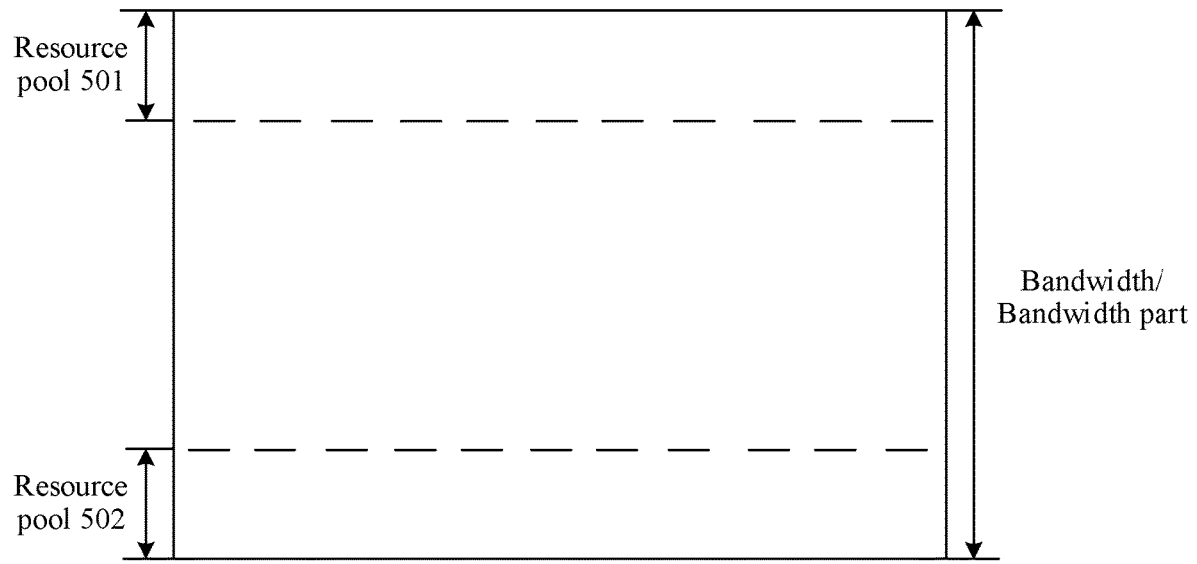
FIG. 5 is a distribution diagram of a resource pool of a PSFCH according to an embodiment of this application.

The identifier information of the resource pool of the PSFCH is used to indicate an identifier of the resource pool of the PSFCH. The resource pool of the PSFCH may be located at two ends of an entire bandwidth or an entire bandwidth part (BWP). As shown in FIG. 5, the resource pool of the PSFCH may be a bandwidth or a bandwidth part shown in FIG. 5, or the resource pool of the PSFCH may be a resource pool 501 and a resource pool 502 shown in FIG. 5. The resource pool of the PSFCH is specific to the PSFCH. The resource pool of the PSFCH can be used only when other non-feedback control information or data information meets at least one of the following conditions.

1. The second user equipment 102 further needs to send third information when sending the feedback control information to the first user equipment 101, where the third information may include data information, reference information, or sequence information.

2. Resource utilization in a PSCCH and PSSCH resource pool is greater than a first preset threshold (for example, 60%), and resource utilization in the resource pool of the PSFCH is less than a second preset threshold (for example, 50%), or the second user equipment 102 succeeds in feeding back the control information on first Q candidate time-frequency resources of the feedback control information for P consecutive times, where P and Q are positive integers, $1<P<10$, and $1<Q<10$.

3. A quantity of OFDM symbols occupied by data or information sent by the second user equipment 102 is less than or equal to the quantity of OFDM symbols that is of the PSFCH and that is configured by the first user equipment 101 for the second user equipment 102.

If the feedback information is the HARQ-ACK or the HARQ-NACK information, the quantity of codebooks of the feedback control information may indicate a quantity of HARQ-ACK or HARQ-NACK codebooks that the second user equipment needs to feed back to the first user equipment.

If the first information of the first user equipment includes the data information and the first information sent for a plurality of times needs to be fed back by the second user equipment on a same candidate time-frequency resource or codebook, the codebook count of the feedback information may be used to count a quantity of pieces of first information sent by the first user equipment. For example, the codebook count of the feedback information increases by 1 each time one piece of first information is sent.

The candidate time-frequency resource information of the PSFCH includes candidate time domain resource information of the PSFCH and candidate frequency domain resource information of the PSFCH.

Figure 6:
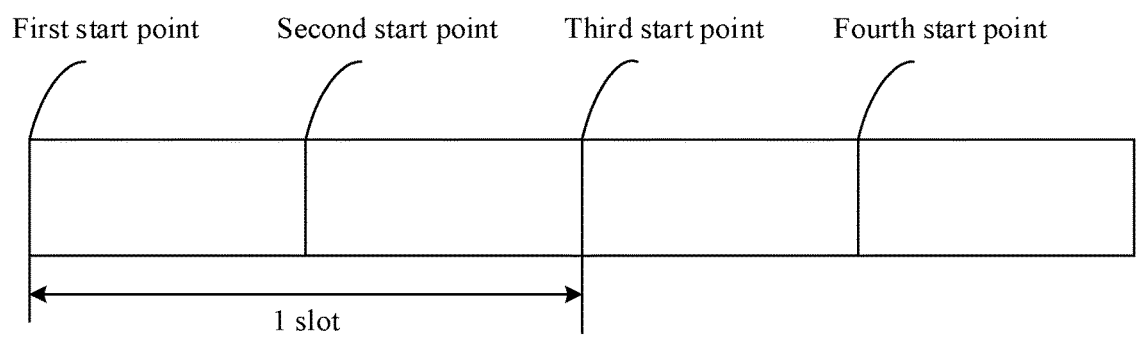
FIG. 6 is a diagram of a candidate time domain resource of a PSFCH according to an embodiment of this application.

In one embodiment, the configuration information of the PSFCH may indicate a length of a time window, a start position of the time window, and a start position bitmap of the PSFCH in the time window, to configure a candidate time domain resource of the PSFCH. The time window may start from an $L^{th}$ slot after a slot in which the second user equipment 102 has received the first information sent by the first user equipment 101, and the length of the time window is M consecutive slots, where L is a positive integer greater than or equal to 0, and M is a positive integer greater than or equal to 1. A start point position of the time window may be located at a boundary of the slot, or may be located at a symbol of the slot. The first user equipment 101 may indicate a start point position of the PSFCH in the time window by using a bitmap (bitmap). As shown in FIG. 6, the length M of the time window is two slots, the time window includes four start points, and the start points in the time window may be represented as $b_0b_1b_2b_3=0101$, that is, the second start point and the fourth start point in the time window may be used for PSFCH access.

In one embodiment, the configuration information of the PSFCH may alternatively indicate a length of a time window and a start position of the time window, to configure a candidate time domain resource of the PSFCH. For example, the configuration information of the PSFCH may indicate a slot in 0-L as the start position of the time window, where L is a positive integer not greater than 16. For example, if the length M of the time window is two slots, and the start position of the time window is 5, it may indicate that start points in the fifth slot and the sixth slot after the slot in which the second user equipment 102 has received the first information sent by the first user equipment 101 may be used for PSFCH access.

In one embodiment, the configuration information of the PSFCH may further indicate a length of a time window and a start position bitmap of the PSFCH in the time window, to configure a candidate time domain resource of the PSFCH. For example, if the length M of the time window is two slots, the time window includes four start points, and the start points in the time window may be represented as $b_0b_1b_2b_3=0101$, the PSFCH may be accessed at the second start point and the fourth start point in the first slot and the second slot after the slot in which the second user equipment 102 has received the first information sent by the first user equipment 101, and the PSFCH may further be accessed at the second start point and the fourth start point in the third slot and the fourth slot after the slot in which the second user equipment 102 has received the first information sent by the first user equipment 101.

Figure 7:
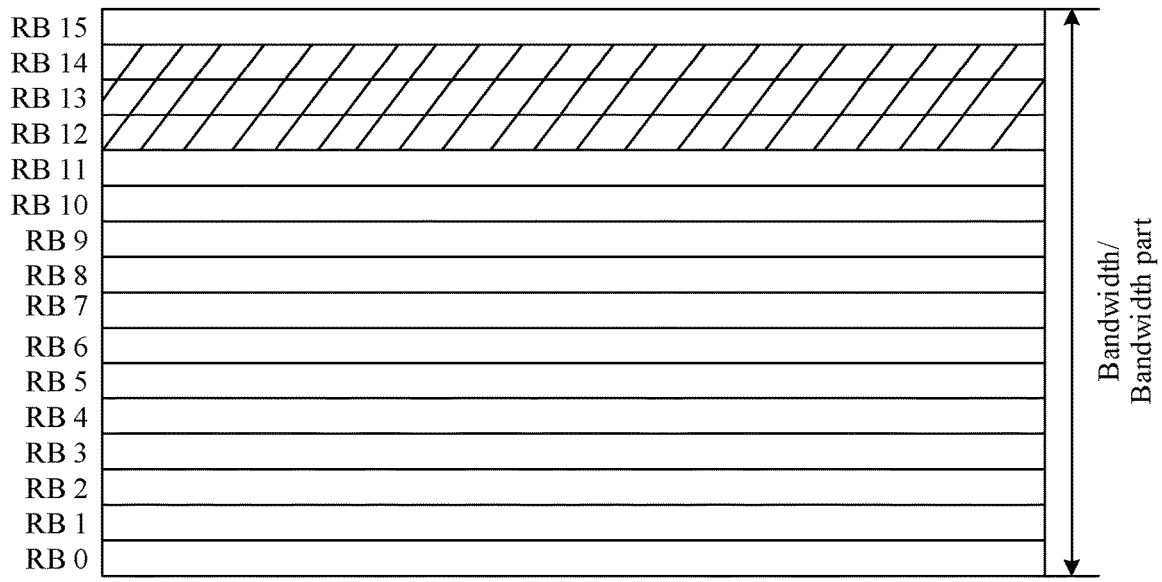
FIG. 7 is a diagram of a candidate frequency domain resource of a PSFCH according to an embodiment of this application.

In one embodiment, the configuration information of the PSFCH may indicate an offset of a start resource block RB, a quantity of RBs, and a quantity of candidate frequency domain resources, to configure a candidate frequency domain resource of the PSFCH. The offset of the start RB is used to indicate an RB index of the candidate frequency domain resource in a configuration resource pool relative to a resource pool boundary. For example, as shown in FIG. 7, the resource pool of the PSFCH is located in a bandwidth RB 10 to a bandwidth RB 15, the offset of the start RB of the PSFCH is 2, the quantity of RBs is 1, and the quantity of candidate frequency domain resources is 3. In this case, the candidate frequency domain resources of the PSFCH are RBs 12 to 14.

The repetition quantity information of the configuration information is used to indicate a quantity of times that the configuration information of the PSFCH can be repeatedly used. If the first user equipment 101 periodically sends the data or the information to the second user equipment 102, or the first user equipment 101 wants to use the same configuration information of the PSFCH, the first user equipment 101 may determine, by configuring a quantity $T_1$ of repetitions of the configuration information, that the current configuration information of the PSFCH can be repeatedly used. For example, the first user equipment 101 sends the data or the information to the second user equipment at a periodicity t. When sending the data or the information for the first time, the first user equipment 101 may include the configuration information of the PSFCH in sidelink control information (sidelink control information, SCI), where the configuration information of the PSFCH includes the quantity of repetitions $T_1$ of the configuration information. Therefore, in the data or the information sent $T_1$-1 times subsequently, the configuration information of the PSFCH does not need to be sent. The second user equipment 102 may also indicate or configure the candidate time-frequency resource of the PSFCH based on the configuration information that is of the PSFCH and that is sent for the first time, to reduce signaling overheads. Two or more bits may be used to indicate the repetition quantity information of the configuration information. For example, the repetition quantity information of the configuration information is set to 00, to indicate that the feedback control information of the first information does not need to be repeatedly sent. For example, the repetition quantity information of the configuration information may alternatively be set to infinity. If the repetition quantity information of the configuration information is set to infinity, the first user equipment may further send configuration release information to the second user equipment, to release the configuration information of the PSFCH. On the other hand, regardless of whether the quantity of repetitions is set to a specific value or infinity, if the second user equipment receives new configuration information that is of the PSFCH and that is sent by the first user equipment, the second user equipment updates the previous configuration information of the PSFCH, and uses the new configuration information of the PSFCH.

Operation 402: The first user equipment 101 sends the configuration information of the PSFCH to the second user equipment 102.

The first user equipment 101 may send the configuration information of the PSFCH to the second user equipment 102 through the PSCCH or the PSSCH.

Operation 403: The second user equipment 102 determines the resource pool of the PSFCH based on the configuration information of the PSFCH.

It should be noted that the second user equipment 102 may determine the resource pool of the PSFCH based on the identifier information of the resource pool of the PSFCH in the configuration information of the PSFCH. The identifier information of the resource pool of the PSFCH may include an identifier of at least one resource pool of the PSFCH.

Operation 404: The second user equipment 102 determines the candidate time-frequency resource in the resource pool based on the configuration information of the PSFCH.

It should be noted that the second user equipment 102 may determine the candidate time-frequency resource in the resource pool based on the candidate time-frequency resource information of the PSFCH in the configuration information of the PSFCH. The candidate time-frequency resource information of the PSFCH includes the candidate time domain resource information of the PSFCH and the candidate frequency domain resource information of the PSFCH.

In one embodiment, the second user equipment 102 may determine a candidate time domain resource of the PSFCH based on a length of a time window, a start position of the time window, and a start position bitmap in the time window. In one embodiment, the second user equipment 102 may alternatively determine a candidate time domain resource of the PSFCH based on a length of a time window and a start position of the time window. In one embodiment, the second user equipment 102 may alternatively determine a candidate time domain resource of the PSFCH based on a length of a time window and a start position bitmap in the time window.

In one embodiment, the second user equipment 102 may configure a candidate frequency domain resource of the PSFCH based on an offset of a start RB, a quantity of RBs, and a quantity of candidate frequency domain time-frequency resources.

Operation 405: The second user equipment 102 sends the feedback control information to the first user equipment 101 on the candidate time-frequency resource indicated or configured by using the configuration information of the PSFCH.

Further, the second user equipment 102 performs detection on a channel on which the candidate time-frequency resource indicated or configured by using the configuration information of the PSFCH is located; and if a channel on which a first candidate time-frequency resource is located is idle, the second user equipment sends the feedback control information to the first user equipment 101 on the first candidate time-frequency resource. The channel on which the candidate time-frequency resource is located is a part of the BWP, and the first candidate time-frequency resource may be a candidate time-frequency resource whose start position is located in the front. A detection manner may be listen before talk (LBT), clear channel assessment (CCA), or another detection manner.

Further, if the configuration information of the PSFCH in the PSCCH or the PSSCH of the first user equipment 101 does not include the format information of the PSFCH, or the first user equipment 101 does not send the configuration information of the PSFCH to the second user equipment 102, the second user equipment 102 may determine the format of the PSFCH based on an MCS or an SCS of the first information, or the quantity of OFDM symbols of the PSFCH.

It should be noted that the MCS and the SCS of the first information may be configured by a base station for the first user equipment 101 and the second user equipment 102, or may be configured by the first user equipment 101 for the first information based on a current channel state and then sent to the second user equipment 102 by using SCI. The first user equipment 101 and the second user equipment 102 may prestore a correspondence between the format of the PSFCH and the MCS or the SCS, and the second user equipment 102 may determine the format of the PSFCH based on the correspondence.

For example, if the first user equipment 101 configures a relatively high modulation order (for example, 64QAM or 256QAM) or uses a relatively high code rate (for example, ¾) for the first information, the PSFCH may use the second format. If the first user equipment 101 configures a relatively low modulation order (for example, BPSK or QPSK) or uses a relatively low code rate (for example, ¼) for the first information, the PSFCH may use the first format.

For example, if the SCS configured by the first user equipment 101 for the first information is greater than a third preset threshold (for example, 30 KHz), the PSFCH may use the first format. If the SCS configured by the first user equipment 101 for the first information is less than or equal to the third preset threshold (for example, 30 KHz), the PSFCH may use the second format.

The second user equipment 102 may further determine the format of the PSFCH based on the quantity of OFDM symbols of the PSFCH in the SCI or the configuration information of the PSFCH. For example, if the quantity of OFDM symbols of the PSFCH is 2, the PSFCH may use the second format. If the quantity of OFDM symbols of the PSFCH is 14, the PSFCH may use the first format.

Further, if the configuration information of the PSFCH in the PSCCH or the PSSCH of the first user equipment 101 does not include the quantity of OFDM symbols of the PSFCH, or the first user equipment 101 does not send the configuration information of the PSFCH to the second user equipment 102, the second user equipment 102 may determine the quantity of OFDM symbols of the PSFCH based on the MCS or the SCS of the first information, or the format of the PSFCH. It should be noted that the MCS and the SCS of the first information may be configured by a base station for the first user equipment 101 and the second user equipment 102, or may be configured by the first user equipment 101 for the first information based on a current channel state and then sent to the second user equipment 102 by using SCI. The first user equipment 101 and the second user equipment 102 may prestore a correspondence between the quantity of OFDM symbols of the PSFCH and the MCS or the SCS, and the second user equipment 102 may determine the quantity of OFDM symbols of the PSFCH based on the correspondence.

For example, if the first user equipment 101 configures a relatively high modulation order (for example, 64QAM or 256QAM) or uses a relatively high code rate (for example, ¾) for the first information, the PSFCH may use a relatively small quantity of symbols (for example, 2 symbols). If the first user equipment 101 configures a relatively low modulation order (for example, BPSK or QPSK) for the first information or uses a relatively low code rate (for example, ½), the PSFCH may use a relatively large quantity of symbols (for example, 14 symbols).

For example, if the SCS configured by the first user equipment 101 for the first information is greater than a third preset threshold (for example, 30 KHz), the PSFCH may use a relatively large quantity of symbols (for example, 14 symbols). If the SCS configured by the first user equipment 101 for the first information is less than or equal to the third preset threshold (for example, 30 KHz), the PSFCH may use a relatively small quantity of symbols (for example, 2 symbols).

The second user equipment 102 may further determine the quantity of OFDM symbols of the PSFCH based on the format of the PSFCH in the SCI or the configuration information of the PSFCH. For example, if the format of the PSFCH is the second format, the PSFCH may use a relatively small quantity of symbols (for example, 2 symbols). If the PSFCH format is the first format, the PSFCH may use a relatively large quantity of symbols (for example, 14 symbols).

Alternatively, the PSFCH may use a fixed format of the PSFCH and a variable quantity of OFDM symbols of the PSFCH, and the second user equipment 102 may determine the quantity of OFDM symbols of the PSFCH based on the MCS or the SCS of the first information. For example, the format of the PSFCH is the first format, and the quantity of OFDM symbols of the PSFCH may vary in {2, 4, 7, 14}. In this case, a higher modulation order or a higher code rate of the first information indicates a smaller quantity of symbols used by the PSFCH. If a modulation scheme of the first information is 256QAM and a code rate is ½, the PSFCH uses 2 symbols. If the modulation scheme of the first information is 64QAM and the code rate is ½, the PSFCH uses 4 symbols. If the modulation scheme of the first information is 16QAM and the code rate is ¼, the PSFCH uses 14 symbols.

Further, a quantity of second user equipments 102 may be N, where N is a positive integer greater than or equal to 1, and the configuration information of the PSFCH further includes a candidate time-frequency resource offset.

When N=1, the method is applicable to the unicast scenario. The candidate time-frequency resource offset is 0.

When N>1, the method is applicable to the multicast scenario. The candidate time-frequency resource offset may include a candidate time domain offset and/or a candidate frequency domain offset. The candidate time domain offset may be used to configure the start position of the time window, and the candidate frequency domain offset may be used to configure the offset of the start RB.

In the multicast scenario, sequence identifiers of the N second user equipments are preconfigured for the first user equipment 101 and the N second user equipments 102. The first user equipment 101 may configure a second candidate time-frequency resource for the first second user equipment according to the feedback control channel configuration method in the unicast scenario. $i^{th}$ second user equipment may determine a candidate time-frequency resource of the $i^{th}$ second user equipment based on the second candidate time-frequency resource, the candidate time-frequency resource offset, and a sequence identifier of the $i^{th}$ second user equipment, where $1 < i \leq N$.

Further, Candidate time-frequency resource of the $i^{th}$ second user equipment=Second candidate time-frequency resource+Candidate time-frequency resource offset*Sequence identifier of the $i^{th}$ second user equipment.

Figure 8:
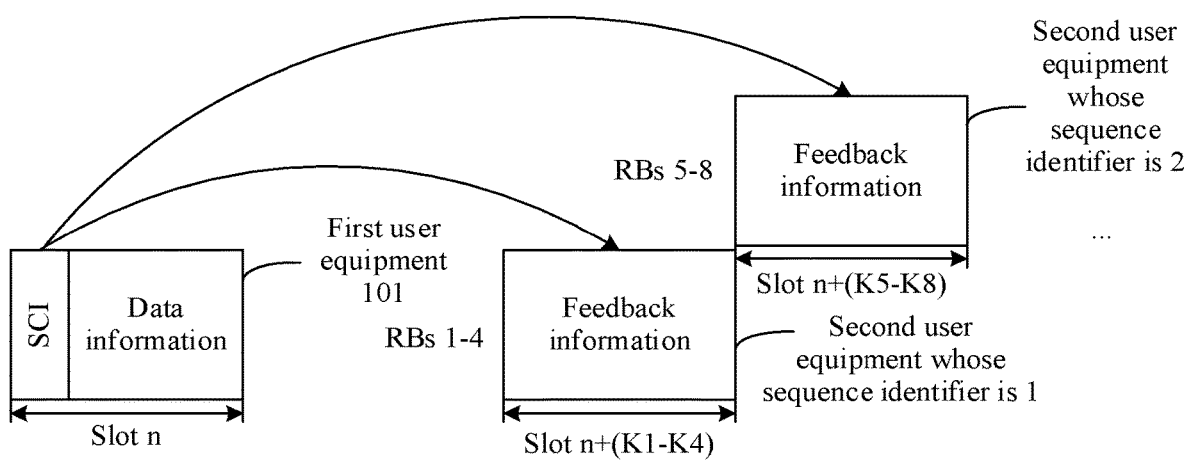
FIG. 8 is a diagram of resource configuration of N second user equipments according to an embodiment of this application.

For example, as shown in FIG. 8, the first user equipment 101 sends the first information to the N second user equipments in the slot n. The first information includes the SCI. The SCI carries the configuration information of the PSFCH. The configuration information of the PSFCH includes the candidate time domain offset and/or the candidate frequency domain offset, and values of the candidate time domain offset and the candidate frequency domain offset are 4. RBs occupied by feedback control information of the second user equipment whose sequence identifier is 1 are 1 to 4, and a quantity of slots is 1 to 4. RBs occupied by feedback control information of the second user equipment whose sequence identifier is 2 are 5 to 8, and the quantity of slots is 5 to 8. The rest may be deduced by analogy.

The N second user equipments 102 may be sorted in ascending or descending order of the identifiers of the N second user equipments, in ascending or descending order of destination identifiers (Destination ID) of the N second user equipments serving as data or information destinations, in ascending or descending order of source identifiers (Source ID) of the N second user equipments serving as feedback information senders, in ascending or descending order of priorities of the N second user equipments, and in ascending or descending order of path losses between the N second user equipments and the first user equipment. A person skilled in the art should understand that the N second user equipments may alternatively be sorted in another manner. This is not specifically limited in this application.

The foregoing mainly describes the solutions provided in the embodiments of this application from a perspective of interaction between network elements. It may be understood that, to implement the foregoing functions, the first user equipment 101 or the second user equipment 102 includes corresponding hardware structures and/or software modules for performing the functions. A person skilled in the art should easily be aware that, in combination with units and algorithm operations of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions of each particular application, but it should not be considered that the implementation goes beyond the scope of this application.

In the embodiments of this application, the first user equipment 101 and the second user equipment 102 may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division into the modules is an example, and is merely logical function division. During actual embodiment, another division manner may be used.

Figure 9:
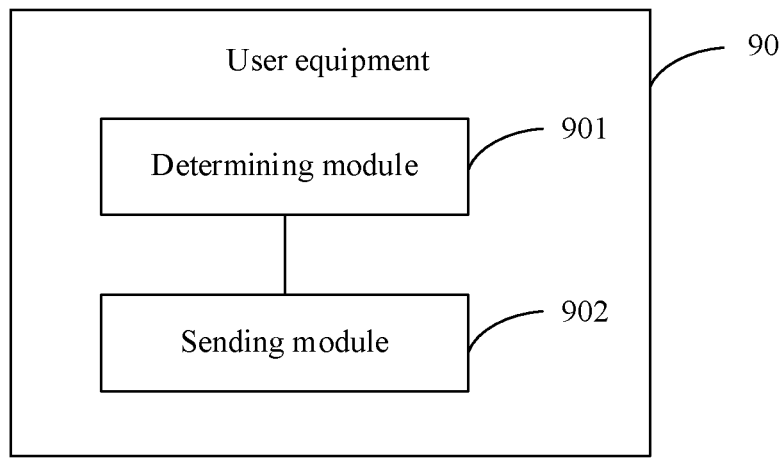
FIG. 9 is a first diagram of a structure of user equipment according to an embodiment of this application.

For example, when the function modules are obtained through division in an integrated manner, FIG. 9 is a diagram of a structure of user equipment 90. The user equipment 90 includes a determining module 901 and a sending module 902. The determining module 901 is configured to determine configuration information of a physical sidelink feedback control channel PSFCH. The configuration information of the PSFCH is used to indicate or configure a candidate time-frequency resource of the PSFCH, and the candidate time-frequency resource of the PSFCH is used to carry feedback control information of first information. The sending module 902 is configured to send the configuration information of the PSFCH to second user equipment.

In one embodiment, the configuration information of the PSFCH includes one or more of the following information: format information of the PSFCH, orthogonal frequency division multiplexing OFDM symbol quantity information of the PSFCH, identifier information of a resource pool of the PSFCH, a quantity of bits of the feedback control information, a quantity of codebooks of the feedback control information, a codebook count of the feedback control information, candidate time-frequency resource information of the PSFCH, and repetition quantity information of the configuration information of the PSFCH.

In one embodiment, there is a correspondence between the format information of the PSFCH and a modulation and coding scheme MCS or a subcarrier spacing SCS of the first information, or a quantity of OFDM symbols of the PSFCH.

In one embodiment, there is a correspondence between the OFDM symbol quantity information of the PSFCH and the MCS or the SCS of the first information, or a format of the PSFCH.

In one embodiment, a quantity of second user equipments is N. N is a positive integer greater than or equal to 1. The configuration information of the PSFCH further includes a candidate time-frequency resource offset, and the candidate time-frequency resource offset is used to configure candidate time-frequency resources of PSFCHs of the N second user equipments.

In one embodiment, the sending module 902 is specifically configured to send the configuration information of the PSFCH through a physical sidelink control channel PSCCH or a physical sidelink shared channel PSSCH.

Figure 10:
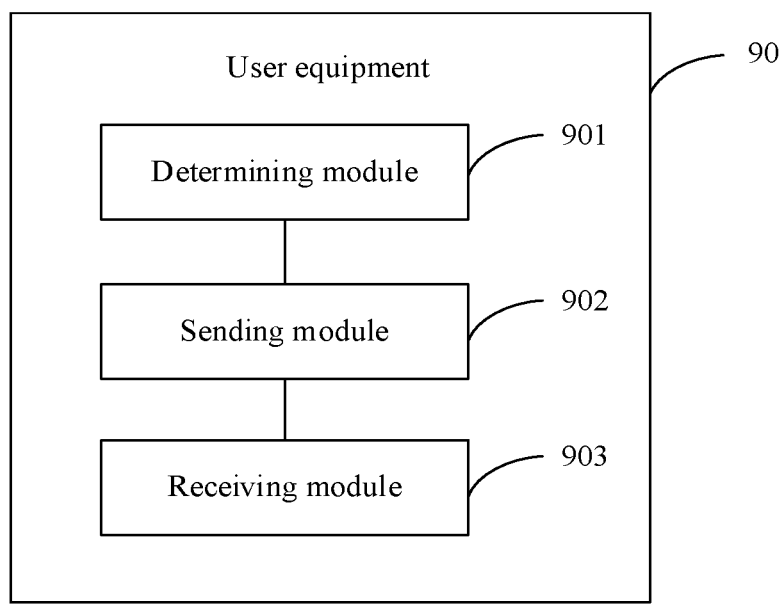
FIG. 10 is a second diagram of a structure of user equipment according to an embodiment of this application.

In one embodiment, as shown in FIG. 10, the user equipment 90 further includes a receiving module 903. The receiving module 903 is configured to receive, on the candidate time-frequency resource indicated or configured by using the configuration information of the PSFCH, the feedback control information sent by the second user equipment.

All related content of the operations in the foregoing method embodiments may be cited in function description of the corresponding function modules. Details are not described herein again.

In this embodiment, the user equipment 90 is presented in a form of the function modules obtained through division in the integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the user equipment 90 may be in a form shown in FIG. 2.

For example, the processor 201 in FIG. 2 may invoke the computer execution instructions stored in the memory 203, so that the user equipment 90 performs the feedback control channel configuration method in the foregoing method embodiment.

For example, functions/implementation processes of the sending module 902, the determining module 901, and the receiving module 903 in FIG. 10 may be implemented by the processor 201 in FIG. 2 by invoking the computer execution instructions stored in the memory 203. Alternatively, a function/implementation process of the determining module 901 in FIG. 10 may be implemented by the processor 201 in FIG. 2 by invoking the computer execution instructions stored in the memory 203, and functions/implementation processes of the sending module 902 and the receiving module 903 in FIG. 10 may be implemented by the communication interface 204 in FIG. 2.

Because the user equipment 90 provided in this embodiment may perform the foregoing feedback control channel configuration method. Therefore, for a technical effect that can be achieved by the user equipment 90, refer to the foregoing method embodiment. Details are not described herein again.

In one embodiment, an embodiment of this application further provides an apparatus (for example, the apparatus may be a chip system). The apparatus includes a processor, configured to support the first user equipment 101 in implementing the foregoing feedback control channel configuration method, for example, determining configuration information of a physical sidelink feedback control channel PSFCH, and sending the configuration information of the PSFCH to second user equipment. In a possible design, the apparatus further includes a memory. The memory is configured to store program instructions and data that are necessary for the first user equipment. Certainly, the memory may alternatively not be in the apparatus. When the apparatus is the chip system, the apparatus may include a chip, or may include a chip and another discrete component. This is not specifically limited in this embodiment of this application.

Figure 11:
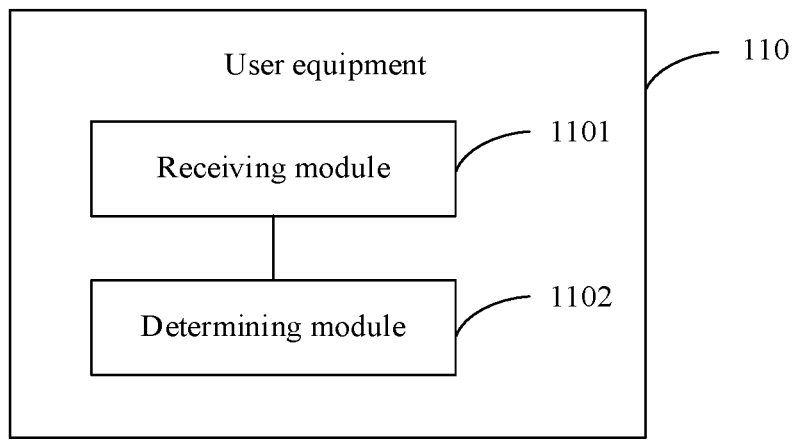
FIG. 11 is a third diagram of a structure of user equipment according to an embodiment of this application.

Alternatively, for example, when the function modules are obtained through division in an integrated manner, FIG. 11 is a diagram of a structure of user equipment 110. The user equipment 110 includes a receiving module 1101 and a determining module 1102. The receiving module 1101 is configured to receive configuration information of a PSFCH from first user equipment. The configuration information of the PSFCH is used to indicate or configure a candidate time-frequency resource of the PSFCH, and the candidate time-frequency resource of the PSFCH is used to carry feedback control information of first information. The determining module 1102 is configured to determine a resource pool of the PSFCH based on the configuration information of the PSFCH. The determining module 1102 is further configured to determine a candidate time-frequency resource in the resource pool based on the configuration information of the PSFCH.

In one embodiment, the configuration information of the PSFCH includes one or more of the following information: format information of the PSFCH, OFDM symbol quantity information of the PSFCH, identifier information of a resource pool of the PSFCH, a quantity of bits of the feedback control information, a quantity of codebooks of the feedback control information, a codebook count of the feedback control information, candidate time-frequency resource information of the PSFCH, and repetition quantity information of the configuration information of the PSFCH.

In one embodiment, the user equipment 110 determines a format of the PSFCH based on an MCS or an SCS of the first information, or a quantity of OFDM symbols of the PSFCH.

In one embodiment, the user equipment 110 determines the quantity of OFDM symbols of the PSFCH based on the MCS or the SCS of the first information, or the format of the PSFCH.

In one embodiment, a quantity of user equipments 110 is N. N is a positive integer greater than or equal to 1. The configuration information of the PSFCH further includes a candidate time-frequency resource offset, and the candidate time-frequency resource offset is used to configure the candidate time-frequency resources of the PSFCH.

Figure 12:
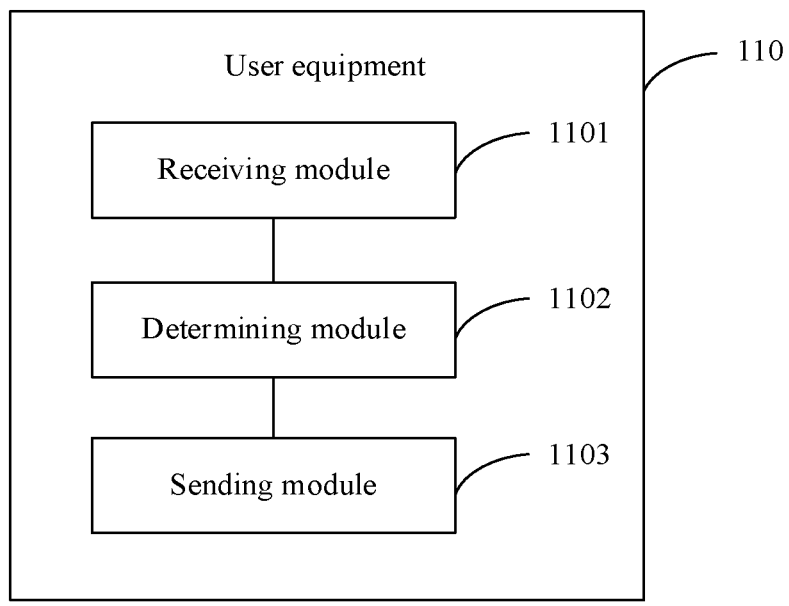
FIG. 12 is a fourth diagram of a structure of user equipment according to an embodiment of this application.

In one embodiment, as shown in FIG. 12, the user equipment 110 further includes a sending module 1103.

The sending module 1103 is configured to send the feedback control information to the first user equipment on the candidate time-frequency resource indicated or configured by using the configuration information of the PSFCH.

In one embodiment, the sending module 1103 is specifically configured to: perform detection on a channel on which the candidate time-frequency resource indicated or configured by using the configuration information of the PSFCH is located; and if a channel on which a first candidate time-frequency resource is located is idle, send, by the user equipment, the feedback control information to the first user equipment on the first candidate time-frequency resource.

All related content of the operations in the foregoing method embodiments may be cited in function description of the corresponding function modules. Details are not described herein again.

In this embodiment, the user equipment 110 is presented in a form of the function modules obtained through division in the integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the user equipment 110 may be in a form shown in FIG. 2.

For example, the processor 201 in FIG. 2 may invoke the computer execution instructions stored in the memory 203, so that the user equipment 110 performs the feedback control channel configuration method in the foregoing method embodiment.

For example, functions/implementation processes of the receiving module 1101, the sending module 1103, and the determining module 1102 in FIG. 12 may be implemented by the processor 201 in FIG. 2 by invoking the computer execution instructions stored in the memory 203. Alternatively, a function/implementation process of the determining module 1102 in FIG. 12 may be implemented by the processor 201 in FIG. 2 by invoking the computer execution instructions stored in the memory 203, and functions/implementation processes of the receiving module 1101 and the sending module 1103 in FIG. 12 may be implemented by the communication interface 204 in FIG. 2.

Because the user equipment 110 provided in this embodiment may perform the foregoing feedback control channel configuration method. Therefore, for a technical effect that can be achieved by the user equipment 110, refer to the foregoing method embodiment. Details are not described herein again.

In one embodiment, this application further provides an apparatus (for example, the apparatus may be a chip system). The apparatus includes a processor, configured to support the user equipment 110 in implementing the foregoing feedback control channel configuration method, for example, receiving configuration information of a PSFCH from first user equipment, and determining a resource pool of the PSFCH and a candidate time-frequency resource in the resource pool based on the configuration information of the PSFCH. In a possible design, the apparatus further includes a memory. The memory is configured to store program instructions and data that are necessary for the user equipment. Certainly, the memory may alternatively not be in the apparatus. When the apparatus is the chip system, the apparatus may include a chip, or may include a chip and another discrete component. This is not specifically limited in this embodiment of this application.

Figure 13:
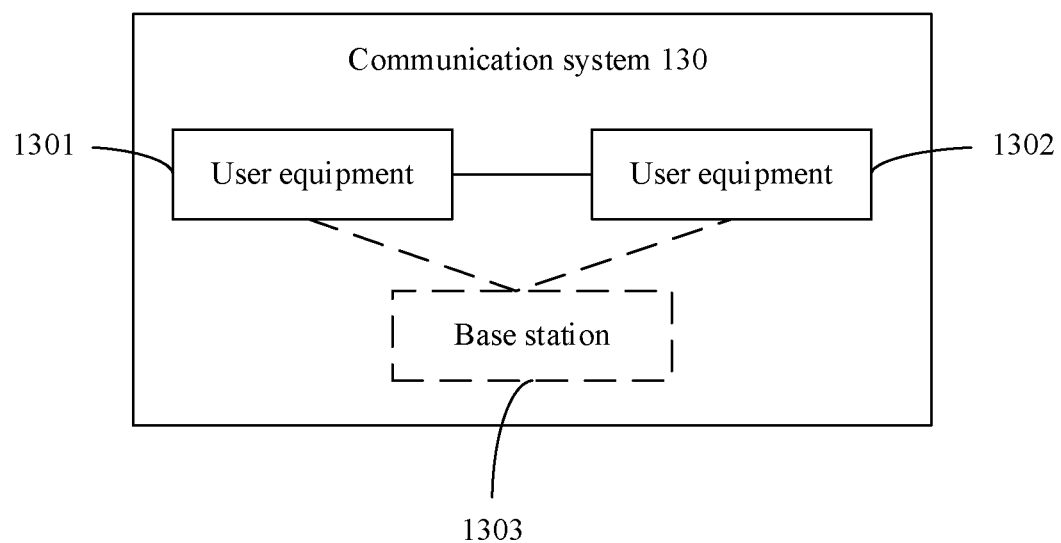
FIG. 13 is a composition diagram a communication system according to an embodiment of this application.

FIG. 13 is a composition diagram of a communication system. As shown in FIG. 13, the communication system 130 may include user equipment 1301 and user equipment 1302. It should be noted that FIG. 13 is merely an accompanying drawing of an example, and network elements included in the communication system 130 shown in FIG. 13 and a quantity of the network elements are not limited in this embodiment of this application.

The user equipment 1301 has a function of the user equipment 90 shown in FIG. 9 or FIG. 10, and may be configured to: determine configuration information of a PSFCH, and send the configuration information of the PSFCH to the user equipment 1302.

The user equipment 1302 has a function of the user equipment 110 shown in FIG. 11 or FIG. 12, and may be configured to: receive the configuration information of the PSFCH from the user equipment 1301, determine a resource pool of the PSFCH based on the configuration information of the PSFCH, and determine a candidate time-frequency resource in the resource pool based on the configuration information of the PSFCH.

In one embodiment, the communication system 130 further includes a base station 1303.

The base station 1303 may be configured to send an MCS and/or an SCS of first information to the user equipment 1301 and/or the user equipment 1302.

It should be noted that all related content of the operations in the foregoing method embodiments may be cited in function description of corresponding network elements of the communication system 130. Details are not described herein again.

The foregoing description about embodiments allows a person skilled in the art to clearly understand that, for the purpose of convenient and brief description, division into the foregoing function modules is merely used as an example for description. In an actual application, the foregoing functions can be allocated to different function modules for implementation based on a requirement. In other words, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate components may be or may not be physically separate, and components displayed as units may be one or more physical units, that is, may be located in one place, or may be distributed on a plurality of different places. Some or all of the units may be selected based on an actual requirement to achieve an objective of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the operations of the methods described in the embodiments of this application. The storage medium includes any medium that can store program code, for example, a USB flash drive, a removable hard disk, a ROM, a RAM, a magnetic disk, or an optical disc.

The foregoing description is merely specific embodiments of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A feedback control channel configuration method, comprising:
   determining, by first user equipment, configuration information of a physical sidelink feedback control channel (PSFCH) to indicate or configure a candidate time-frequency resource of the PSFCH, wherein the candidate time-frequency resource of the PSFCH is to carry feedback control information of first information; and
   sending, by the first user equipment, the configuration information of the PSFCH to one or more second user equipments.

2. The feedback control channel configuration method according to claim 1, wherein the configuration information of the PSFCH comprises one or more of format information of the PSFCH, orthogonal frequency division multiplexing (OFDM) symbol quantity information of the PSFCH, identifier information of a resource pool of the PSFCH, a quantity of bits of the feedback control information, a quantity of codebooks of the feedback control information, a codebook count of the feedback control information, candidate time-frequency resource information of the PSFCH, or repetition quantity information of the configuration information of the PSFCH.

3. The feedback control channel configuration method according to claim 1, wherein there is a correspondence between the format information of the PSFCH and at least one of a modulation and coding scheme (MCS) or a subcarrier spacing (SCS) of the first information, or the OFDM symbol quantity information of the PSFCH.

4. The feedback control channel configuration method according to claim 1, wherein there is a correspondence between the OFDM symbol quantity information of the PSFCH and at least one of the MCS or the SCS of the first information, or the format information of the PSFCH.

5. The feedback control channel configuration method according to claim 1, wherein a quantity of the one or more second user equipments is N, wherein N is a positive integer greater than or equal to 1, and wherein the configuration information of the PSFCH further comprises a candidate time-frequency resource offset to configure candidate time-frequency resources of PSFCHs of the one or more second user equipments.

6. The feedback control channel configuration method according to claim 1, wherein the sending, by the first user equipment, the configuration information of the PSFCH to one or more second user equipments comprises:
   sending, by the first user equipment, the configuration information of the PSFCH through a physical sidelink control channel PSCCH or a physical sidelink shared channel PSSCH to the one or more second user equipments.

7. The feedback control channel configuration method according to claim 1, further comprising: receiving, by the first user equipment on the candidate time-frequency resource indicated or configured by using the configuration information of the PSFCH, the feedback control information sent by the one or more second user equipments.

8. A feedback control channel configuration method, comprising:
   receiving, by one or more second user equipments, configuration information of a physical sidelink feedback control channel (PSFCH) to indicate or configure a candidate time-frequency resource of the PSFCH from first user equipment, wherein the candidate time-frequency resource of the PSFCH is to carry feedback control information of first information;
   determining, by the one or more second user equipments, a resource pool of the PSFCH based on the configuration information of the PSFCH; and
   determining, by the one or more second user equipments, the candidate time-frequency resource in the resource pool based on the configuration information of the PSFCH.

9. The feedback control channel configuration method according to claim 8, wherein the configuration information of the PSFCH comprises one or more of format information of the PSFCH, orthogonal frequency division multiplexing (OFDM) symbol quantity information of the PSFCH, identifier information of the resource pool of the PSFCH, a quantity of bits of the feedback control information, a quantity of codebooks of the feedback control information, a codebook count of the feedback control information, candidate time-frequency resource information of the PSFCH, or repetition quantity information of the configuration information of the PSFCH.

10. The feedback control channel configuration method according to claim 8, wherein the one or more second user equipments determine a format of the PSFCH based on at least one of a modulation and coding scheme (MCS) or a subcarrier spacing (SCS) of the first information, or the OFDM symbol quantity information of the PSFCH.

11. The feedback control channel configuration method according to claim 8, wherein the one or more second user equipments determine a quantity of OFDM symbols of the PSFCH based on at least one of the MCS or the SCS of the first information, or the format information of the PSFCH.

12. The feedback control channel configuration method according to claim 8, wherein a quantity of the one or more second user equipments is N, wherein N is a positive integer greater than or equal to 1, and wherein the configuration information of the PSFCH further comprises a candidate time-frequency resource offset to configure the candidate time-frequency resource of the PSFCH.

13. The feedback control channel configuration method according to claim 8, further comprising:
   sending, by the one or more second user equipments, the feedback control information to the first user equipment on the candidate time-frequency resource indicated or configured by using the configuration information of the PSFCH.

14. The feedback control channel configuration method according to claim 13, wherein the sending, by the one or more second user equipments, the feedback control information to the first user equipment on the candidate time-frequency resource indicated or configured by using the configuration information of the PSFCH comprises:
   performing, by the one or more second user equipments, detection on a channel on which the candidate time-frequency resource indicated or configured by using the configuration information of the PSFCH is located;

in response to that a channel on which a first candidate time-frequency resource is located is idle, sending, by the one or more second user equipments, the feedback control information to the first user equipment on the first candidate time-frequency resource.

15. A user equipment, comprising:

a processor; and a memory coupled to the processor to store instructions, which when executed by the processor, cause the processor to perform operations, the operations including determining configuration information of a physical sidelink feedback control channel (PSFCH) to indicate or configure a candidate time-frequency resource of the PSFCH, wherein the candidate time-frequency resource of the PSFCH is to carry feedback control information of first information; and sending the configuration information of the PSFCH to one or more second user equipments.

16. The user equipment according to claim 15, wherein the configuration information of the PSFCH comprises one or more of format information of the PSFCH, orthogonal frequency division multiplexing (OFDM) symbol quantity information of the PSFCH, identifier information of a resource pool of the PSFCH, a quantity of bits of the feedback control information, a quantity of codebooks of the feedback control information, a codebook count of the feedback control information, candidate time-frequency resource information of the PSFCH, or repetition quantity information of the configuration information of the PSFCH.

17. The user equipment according to claim 15, wherein there is a correspondence between the format information of the PSFCH and at least one of a modulation and coding scheme (MCS) or a subcarrier spacing (SCS) of the first information, or the OFDM symbol quantity information of the PSFCH.

18. The user equipment according to claim 15, wherein there is a correspondence between the OFDM symbol quantity information of the PSFCH and at least one of the MCS or the SCS of the first information, or the format information of the PSFCH.

19. The user equipment according to claim 15, wherein a quantity of the one or more second user equipments is N, wherein N is a positive integer greater than or equal to 1, and wherein the configuration information of the PSFCH further comprises a candidate time-frequency resource offset to configure candidate time-frequency resources of PSFCHs of the N second user equipments.

20. The user equipment according to claim 15, wherein the sending the configuration information of the PSFCH to one or more second user equipments comprises sending the configuration information of the PSFCH through a physical sidelink control channel PSCCH or a physical sidelink shared channel PSSCH to the one or more second user equipments.

* * * * *